United States Patent [19]

Hunter et al.

[11] 4,012,328
[45] Mar. 15, 1977

[54] ACID SOLUBLE PACKER AND WORKOVER FLUID

[75] Inventors: Melvel P. Hunter; Karl E. Gillenwater; Henry J. Warren, all of Houston, Tex.

[73] Assignee: Dresser Industries, Inc., Dallas, Tex.

[22] Filed: Mar. 3, 1975

[21] Appl. No.: 554,881

Related U.S. Application Data

[63] Continuation of Ser. No. 345,926, March 29, 1973, abandoned.

[52] U.S. Cl. .................... 252/855 R; 252/8.5 C; 166/270; 166/294
[51] Int. Cl.$^2$ ............... C09K 3/00; C09K 7/00; E21B 43/22
[58] Field of Search ............. 252/8.55 R, 8.5 C; 166/270, 294

[56] References Cited

UNITED STATES PATENTS

| | | | |
|---|---|---|---|
| 3,625,889 | 12/1971 | Branscum | 252/8.5 A |
| 3,658,129 | 4/1972 | Lanning et al. | 166/270 |
| 3,699,042 | 10/1972 | Browning et al. | 252/8.5 C |
| 3,757,863 | 9/1973 | Clampitt et al. | 166/307 |
| 3,762,476 | 10/1973 | Gall | 166/294 |
| 3,800,872 | 4/1974 | Friedman | 166/270 |

*Primary Examiner*—Benjamin R. Padgett
*Assistant Examiner*—Josephine Lloyd
*Attorney, Agent, or Firm*—R. T. Majesko; J. H. Hazelwood

[57] ABSTRACT

A well completion and packer fluid additive consisting essentially of carboxymethyl cellulose crosslinked with an inorganic chromium compound. The fluids prepared with this procedure have temperature stability to 250° F., excellent resistance to contamination, stability in electrolyte solutions such as KCl and CaCl$_2$ and upon acidizing the fluid retains less the 3% residue.

3 Claims, No Drawings

ACID SOLUBLE PACKER AND WORKOVER FLUID

This is a continuation, of application Ser. No. 345,926 now abandoned, filed 3/29/73.

In completing oil and gas wells, the completion-packer fluid should be selected only after proper consideration of mechanical factors and formation characteristics peculiar to the given operation. One of the first considerations must be given to maintaining control of the well at all times, especially during perforations. This is accomplished by maintaining a hydrostatic pressure equal to or slightly greater than the formation pressure exposed when the casing is perforated. Thus in many applications weighting agents such as barium sulfate, calcium carbonate, iron oxide or other heavy solids must be added to the fluid to achieve the desired density. This requires that the fluid have sufficient viscosity and gel structure to suspend the added weight material. However, the viscosity and gel structure must be such that pumping operations will not be difficult. Since a well packer fluid is maintained under quiescent conditions in the well bore at elevated temperatures for substantial periods of time, the high temperature properties of the fluid must be thermally stable and remain fluid such that the mud does not gel into a cement like consistency. This is required because periodically most wells must be reworked which involves the packer fluid being displaced from the annulus. If the fluid becomes unpumpable and the packer fluid cannot be removed from the well bore, it becomes necessary to mechanically drill out the solidified mud. This increases the cost of reworking the well.

Another factor which must be given consideration in selecting a completion-packer fluid is the formation characteristics as the type of formation in which completion will be conducted. This includes characteristics as permeability, clay content and sensitivity of the formation. If a proper completion fluid is not selected, formations being tested may be termed nonproductive and thereby condemned when actually the formation may contain economically producible oil and/or gas. This condition is usually created by permeability damage to the formation.

There are several mechanisms by which flow potential can be reduced or permeability damaged. However, in selecting a completion-packer fluid there are two parameters which become extremely critical. The first is the type of solids in the fluid. In routine completion operations when the casing is perforated under a hydrostatic column of drilling fluid, the fluid flows into the perforations because of differential pressures. The perforations are thereby partially or completely plugged with the fluid. The degree of plugging depends upon the differential pressure and the flow. If the plugging is severe, it is difficult to remove by subsequent flow from the formation into the well bore and by that the productivity of a perforated interval in a producing zone is significantly reduced. One solution to this problem is to utilize an acid soluble completion-packer fluid according to this invention.

The other parameter which must be considered is the type and sensitivity of the formation in which completion is being conducted. If the formation contains varying concentrations of a swelling and easily disposed clay, especially montmorillonite, then a fluid should be used which will inhibit hydration of the clay or prevent remineralization of these clays. We have found that such a fluid can be designed by adding electrolytes to the system of the invention.

As drilling continues deeper in search of petroleum more stringent requirements are being demanded of completion-packer fluid. In addition to the normal increases in temperature gradient, these conditions are greatly complexed by the advent of multiple completions. In accordance with the present invention, these parameters can be adequately satisfied by employing the improved well completion-packer fluid hereinafter described.

We have found that a very effective completion-packer fluid additive is obtained by crosslinking carboxymethyl cellulose with a water soluble chromium compound. The fluids prepared with this procedure have temperature stability to 250° F., excellent resistance to contamination, stability in electrolyte solutions as potassium chloride and calcium chloride and upon acidizing the fluid retains less than 3% residue.

According to a preferred embodiment of this invention a well completion-packer fluid additive is prepared consisting essentially of (1) sodium carboxymethyl cellulose and (2) a chromic chloride or chromic acetate salt which acts as a crosslinking agent to get maximum yield from the CMC. In addition, the system can contain electrolytes for hole stability or electrolytes as calcium chloride and sodium chloride can be used as weighting agents.

Sodium carboxymethyl cellulose is a water soluble cellulose derivative prepared by the reaction of sodium chloracetate with alkali cellulose. The derivative which as the widest application for purposes of this application has a degree of substitution in the range of 0.65 to 0.85. However, a degree of substitution in the range of 0.4 to 1.5 is available and can be used if desired. The degree of substitution is defined as the average number of carboxymethyl groups introduced per anhydroglucose unit in the cellulose. There are several grades of CMC available which varies in viscosity or degree of polymerization. As the chain length increases, the viscosity or yield increases. All grades of the material will crosslink, however, when lower viscosity materials are used, the concentration must be increased to get higher viscosities. CMC is generally used in a concentration range from 0.001% to about 3% by weight. Concentrations in excess of 3% by weight may be employed in certain instances but normally produce such extremely viscous solutions which are difficult to pump at low shear rates.

In preparing a completion-packer fluid additive, the CMC is crosslinked in an aqueous solution with the selected chromium compound. The concentration of crosslinking agent is normally between about 0.001% and about 0.3% by weight. Higher amounts may be utilized with some decrease in effective viscosity.

We have found that the reaction between carboxymethyl cellulose and chromium compounds will give more effective viscosity when mixed in a prescribed order. In addition, the pH of the solution and the amount of crosslinking agent employed in part determines the increase in viscosity. In general, it is preferred to stir the CMC into water with sufficient agitation to form a homogeneous solution. The time necessary will vary from 20 minutes to one hour depending upon the available agitation. If the system is to be prepared with electrolytes such as sodium chloride, potassium chloride, calcium chloride, or the like, then the salts should be added at this step. After the salts have been added, then the system should be weighted to the desired density to balance formation pressures, Addition of weighting materials at this point allows ease of mixing before crosslinking because of viscosity.

After the addition of salts and weighting agents, the CMC can then be crosslinked by adding the chromic salt. The reaction with increase in viscosity is fairly rapid. However, a short period of time should be allowed for maximum yield in viscosity before adjusting the pH with addition of a base. For maximum viscosity yield, the base should be added after the CMC has been crosslinked. The base to be employed, which preferably is magnesium oxide, should be added slowly to avoid precipitating the crosslinking agent. After the base is added, the system should be stirred to give uniform mixing. When desired, a preservative such as formaldehyde, paraformaldehyde, or the like can be added to the system. The preservatives are normally used in concentrations between about 0.001% and about 1% by weight.

The following examples illustrate the viscosity of a completion-packer fluid prepared in accordance with the above procedure. Properties were measured upon initial make-up and then again after heat aging at different temperatures and times. The packer fluid consisted of a 14 lb/gal fluid which contained 216 cc of fresh water, 1.75 lb/bbl of CMC, 367 lb/bbl of calcium carbonate, 0.3 lbs/bbl of chromic chloride and 1 lb/bbl of magnesium oxide. The muds were prepared by mixing in the preferred order: Adding the CMC to water and mixing thoroughly, then adding the calcium carbonate to desired density to balance formation pressures, adding the crosslinking agent and finally adding the magnesium oxide for pH control. After obtaining a homogeneous solution, the rheology of each sample was measured and then placed in a static oven maintained at the temperature indicated. The muds were heat aged for different times and then at the end of this period the rheological properties were again remeasured. All of the samples given in Table I had excellent weight suspension of the solids in the system.

TABLE I

| TEST NUMBER | AGING HOURS | AGING TEMP. | AV (CPS) | PV (CPS) | YP LBS/ 100 FT² | GELS LBS/ 100 FT² | pH |
|---|---|---|---|---|---|---|---|
| 1 | 0 | Room | 127 | 98 | 58 | 65/130 | 9.8 |
| 2 | 16 | 200° F | 114 | 84 | 60 | 10/23 | 9.4 |
| 3 | 40 | 200° F | 106 | 80 | 52 | 7/12 | 9.5 |
| 4 | 64 | 200° F | 103 | 68 | 70 | 8/16 | 9.3 |
| 5 | 120 | 200° F | 93 | 72 | 42 | 6/11 | 8.9 |
| 6 | 168 | 200° F | 78 | 62 | 32 | 8/19 | 8.7 |
| 2-A | 16 | 225° F | 133 | 101 | 63 | 7/11 | 9.3 |
| 3-A | 40 | 225° F | 100 | 75 | 50 | 8/9 | 8.8 |
| 4-A | 64 | 225° F | 80 | 67 | 26 | 3/6 | 8.6 |
| 5-A | 120 | 225° F | 60 | 55 | 10 | 3/3 | 8.5 |
| 6-A | 168 | 225° F | 46 | 43 | 6 | 2/3 | 8.3 |
| 2-B | 16 | 250° F | 74 | 58 | 32 | 5/6 | 9.2 |
| 3-B | 40 | 250° F | 27 | 24 | 6 | 1/4 | 8.8 |
| 4-B | 64 | 250° F | 27 | 26 | 2 | 0/2 | 8.7 |
| 5-B | 120 | 250° F | 26 | 24 | 4 | 2/4 | 8.5 |
| 6-B | 168 | 250° F | 29 | 24 | 10 | 5/17 | 8.3 |

Another unique feature of this system is that the crosslinked CMC is stable in electrolyte solutions. There are a number of other polymers which will crosslink and give a shear thinning thixotropic fluid which can be used as a completion-packer fluid. However, these products are normally only used in fresh water systems. In high electrolyte concentrations, the polymers do not give significant increases in viscosity. An example of one such polymer is a heteropolysaccharide produced by the fermentation of sugar with Xanthomonas campestris organisms. This material is sold commercial under the trademark XC-Polymer. The material does not perform on an equivalent lb/lb basis in high electrolyte concentration. The following series of tests recorded in Table II shows the effective viscosities in different solutions.

TABLE II

| TEST NO. | XC-POLYMER No./BBL | CMC No./BBL | Cr Cl₃ 6H₂O No./BBL | Nacl No./BBL | CaCl₂ No./BBL | Kcl No./BBL | AV (CPS) | PV (CPS) | YP LBS/ 100 FT² | GELS LBS/ 100 FT² |
|---|---|---|---|---|---|---|---|---|---|---|
| A | 1.0 | | 0.3 | | | | 27 | 14 | 26 | 18/68 |
| B | | 1.0 | 0.3 | | | | 97 | 40 | 115 | 81/198 |
| C | 1.0 | | 0.1 | 107 | | | 19 | 11 | 16 | 9/21 |
| D | | 1.0 | 0.1 | 107 | | | 70 | 20 | 100 | 21/57 |
| E | 1.0 | | 0.3 | | 215 | | 30 | 22 | 16 | 3/4 |
| F | | 1.0 | 0.3 | | 215 | | 53 | 40 | 26 | 11/19 |
| G | 1.0 | | 0.1 | | | 14 | 10 | 6 | 8 | 4/30 |
| H | | 1.0 | 0.1 | | | 14 | 36 | 24 | 23 | 7/26 |

The examples shown in Table III illustrate a comparison of the crosslinking efficiency with increasing concentration of the chromic salt. In these examples concentration is expressed in lbs/bbl with consideration that a 42 gallon barrel is intended. The exemplary samples were prepared as described above.

TABLE III

| TEST NO. | CONC CMC No./BBL | CONC Cr Cl₃ 6H₂O No./BBL | AV (CPS) | PV (CPS) | YP LBS/ 100 FT² | GELS LBS/ 100 FT² |
|---|---|---|---|---|---|---|
| 1 | 1 | 0.05 | 61 | 48 | 26 | 2/2 |

TABLE III-continued

| TEST NO. | CONC CMC No./BBL | CONC Cr Cl$_3$ 6H$_2$O No./BBL | AV (CPS) | PV (CPS) | YP LBS/ 100 FT$^2$ | GELS LBS/ 100 FT$^2$ |
|---|---|---|---|---|---|---|
| 2 | 1 | 0.1 | 53 | 42 | 22 | 2/3 |
| 3 | 1 | 0.3 | 61 | 44 | 33 | 6/10 |
| 4 | 1 | 0.5 | 143 | 81 | 125 | 188/290 |
| 5 | 1 | 1.0 | 48 | 15 | 10 | 13/26 |

From the above data, it can be observed that the carboxymethyl cellulose crosslinked with a chromium compound as defined gives superior performance in the presence of a high concentration of electrolytes.

A packer fluid was prepared consisting of 292 cc of saturated salt water, 0.2 lb/bbl chromic chloride, 2 lb/bbl CMC, 0.5 lb/bbl formaldehyde, 160 lb/bbl calcium carbonate and 0.1 lb/bbl lime. The fluid had the following properties: AV 90; PV 54; YP 72 and Gels 33/80.

An additional packer fluid was prepared consisting of 292 cc of saturated salt water, 2 lb/bbl CMC, .2 lb/bbl chromium potassium sulfate (KCr(SO$_4$)$_2$.12H$_2$O), 0.5 lb/bbl formaldehyde, 160 lb/bbl calcium carbonate, 0.1 lb/bbl lime. This fluid had the following properties: AV 31; PV 26; YP 10 and Gels 8/14.

A number of other tests were performed using other crosslinking agents for CMC and were compared with chromic chloride and chromic acetate under the same conditions. The mixes were prepared as they were previously and the rheological properties are given in Table IV below.

The results indicate that only the inventive agents provided an additive capable of suspending the solids in the system.

Having thus described the invention in detail and with sufficient particularity as to enable those skilled in the art to practice it, what is desired to have protected by Letters Patent is set forth in the following claims.

What we claim is:

1. A method for preparing an acid soluble well completion packer fluid comprising forming an aqueous homogeneous solution of carboxymethyl cellulose, adding a weighting material to provide desired density, crosslinking the carboxymethyl cellulose by adding chromium compound selected from the group consisting of chromic chloride and chromic acetate and mixing therewith a chemically basic material at such a rate to avoid precipitating the chromium compound.

2. The method of claim 1 in which said cellulose is sodium carboxymethyl cellulose and is present in a concentration between about 0.001% and 3%, by weight.

3. The method of claim 1 in which said chromium compound is present in a concentration between about 0.001% and 0.3%.

* * * * *

TABLE IV

| TEST NO. | CROSSLINKING AGENT | CONC. No./BBL | AGING HOURS | AGING TEMP° F | AV (CPS) | PV (CPS) | YP LBS/100 FT$^2$ | GELS LBS/100 FT$^2$ | pH |
|---|---|---|---|---|---|---|---|---|---|
| 1 | 0 | 0 | 0 | 0 | 53 | 34 | 39 | 3/3 | 11.2 |
|   |   |   | 16 | 180° | 35 | 27 | 16 | 2/2 | 10.2 |
| 2 | CrCl$_3$ . 6H$_2$O | 0.5 | 0 | 0 | 150 | 101 | 98 | 72/206 | 10.5 |
|   |   |   | 16 | 180° | 73 | 30 | 96 | 36/88 | 10.8 |
| 3 | Cr(C$_2$H$_3$O$_2$)$_3$ . H$_2$O | 0.5 | 0 | 0 | 53 | 35 | 5/38 | 10.0 |  |
|   |   |   | 16 | 180° | 47 | 41 | 12 | 9/44 | 10.1 |
| 4 | Cr$_2$O$_3$ | 0.5 | 0 | 0 | 50 | 32 | 36 | 3/3 | 11.1 |
|   |   |   | 16 | 180° | 33 | 26 | 14 | 2/2 | 10.2 |
| 5 | Cr$_2$(SO$_4$)$_3$ | 0.5 | 0 | 0 | 65 | 38 | 54 | 9/17 | 10.6 |
|   |   |   | 16 | 180° | 33 | 26 | 14 | 2/2 | 10.0 |
| 6 | AlCl$_3$ | 0.5 | 0 | 0 | 45 | 33 | 25 | 2/3 | 9.4 |
|   |   |   | 16 | 180° | 24 | 22 | 4 | 1/1 | 9.9 |
| 7 | FeCl$_3$ | 0.5 | 0 | 0 | 35 | 32 | 12 | 1/2 | 10.7 |
|   |   |   | 16 | 180° | 20 | 18 | 4 | 1/1 | 10.5 |
| 8 | MnCl$_3$ | 0.5 | 0 | 0 | 48 | 33 | 31 | 2/3 | 10.4 |
|   |   |   | 16 | 180° | 35 | 28 | 15 | 2/3 | 9.8 |